United States Patent [19]
Wildermuth

[11] Patent Number: 5,562,323
[45] Date of Patent: Oct. 8, 1996

[54] BUG SHIELD

[76] Inventor: Ricky G. Wildermuth, 6231 Sugarloaf Dr., Grand Blanc, Mich. 48435

[21] Appl. No.: 310,302

[22] Filed: Sep. 22, 1994

[51] Int. Cl.$^6$ ........................................................ B60J 1/20
[52] U.S. Cl. ........................................................ 296/91
[58] Field of Search .............................. 296/91; 180/68.6

[56] References Cited

U.S. PATENT DOCUMENTS

| | | | |
|---|---|---|---|
| 2,793,705 | 5/1957 | Garrity | 296/91 |
| 3,022,848 | 2/1962 | Heiser | 296/91 |
| 4,153,129 | 5/1979 | Redmond | 296/91 |
| 4,627,657 | 12/1986 | Daniels et al. | 296/91 |
| 4,776,627 | 10/1988 | Hutto et al. | 296/91 |
| 5,308,134 | 5/1994 | Stanesic | 296/91 |

FOREIGN PATENT DOCUMENTS 494976  6/1954  Italy ........................................ 296/91

*Primary Examiner*—Dennis H. Pedder
*Attorney, Agent, or Firm*—Charles W. Chandler

[57] ABSTRACT

A bug shield mounted on the hood of a tractor to deflect bugs from colliding with the vehicle's windshield, without forming fastener-receiving openings in the tractor body.

2 Claims, 2 Drawing Sheets

BUG SHIELD

BACKGROUND OF THE INVENTION

This invention is related to bug shields mounted at the forward end of the hood and above the grille of a tractor or truck to deflect bugs from the windshield, and in which the bug shield is mounted without forming fastener-receiving openings in the truck body.

Many tractors and trucks have an elongated hood with the windshield being spaced several feet behind the grille. When the vehicle is moving fairly rapidly, insects splatter the windshield. One solution to this problem has been to mount a shield which extends a few inches above the forward end of the hood, and spans the width of the hood. The bug shield deflects the insects from splattering the windshield. Typically such bug shields require the user to drill installation holes at various locations on the vehicle body. Many tractor owners are reluctant to mar the surface of their vehicle with installation holes, and therefore do not use such bug shields.

SUMMARY OF THE INVENTION

The broad purpose of the present invention is to provide an installation means for mounting a bug shield without forming any fastener-receiving openings in the vehicle body.

In the preferred embodiment of the invention, the bug shield is mounted on a FREIGHTLINER tractor having a flat metal grille plate mounted above the grille, adjacent the forward end of the hood. A metal name plate is mounted in front of the grille plate. The lower edge of the grille plate has a channel-shaped configuration below the forward end of the hood. The name plate has five rearward extending studs received in five openings in the grille plate. Each stud has a spiral groove for receiving a sheet metal nut.

The bug shield, a transparent, acrylic, plastic sheet, is seated on the channel behind the grille plate. The bug shield extends several inches above the hood to deflect bugs from the windshield. The bug shield has five fastener-receiving openings aligned with the existing openings in the grille plate to receive the studs extending from the name plate. The five existing sheet metal nuts attach the bug shield to the grille plate.

An opening in the bug shield permits the user to use the bug shield as a handle for opening or closing the hood.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
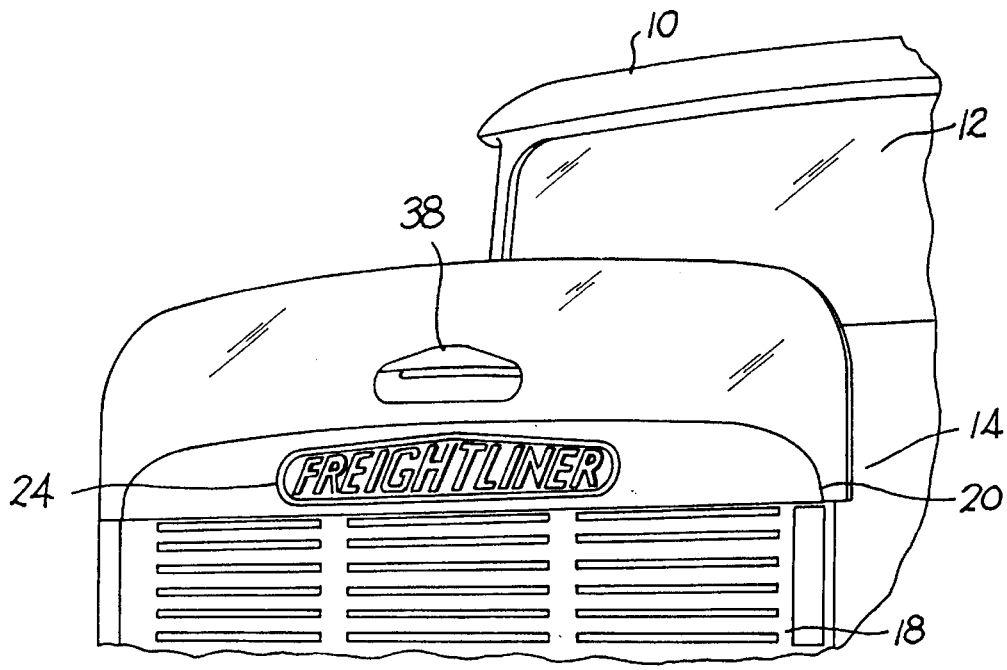
FIG. 1 is a fragmentary perspective view of a tractor having a bug shield mounted in accordance with the invention.
Figure 2:
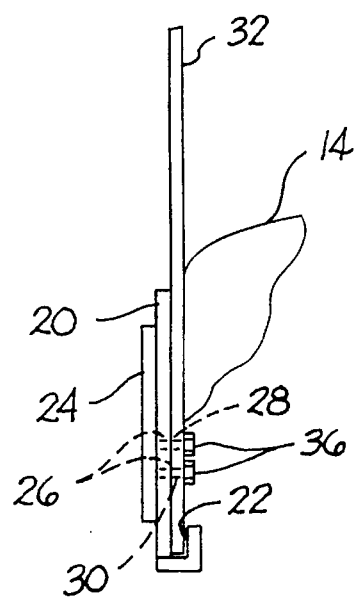
FIG. 2 is an enlarged view as seen from the right side of FIG. 1.
Figure 3:
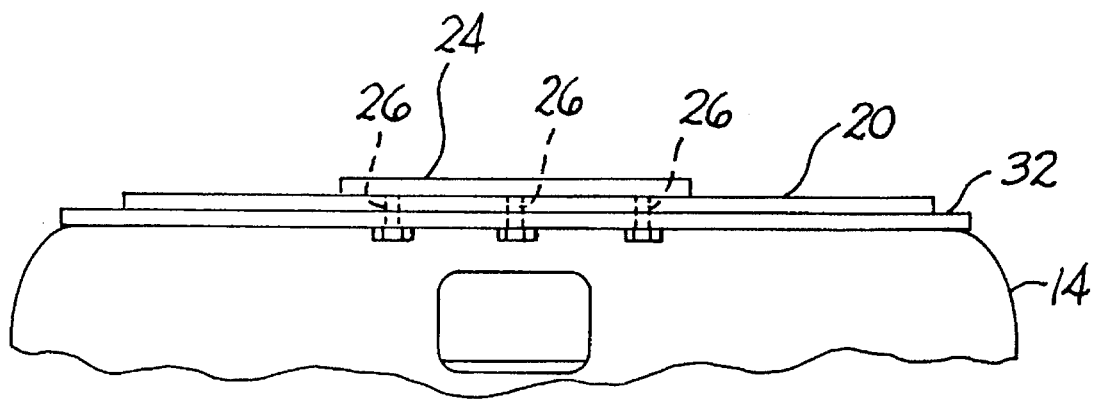
FIG. 3 is a top view of the bug shield.
Figure 4:
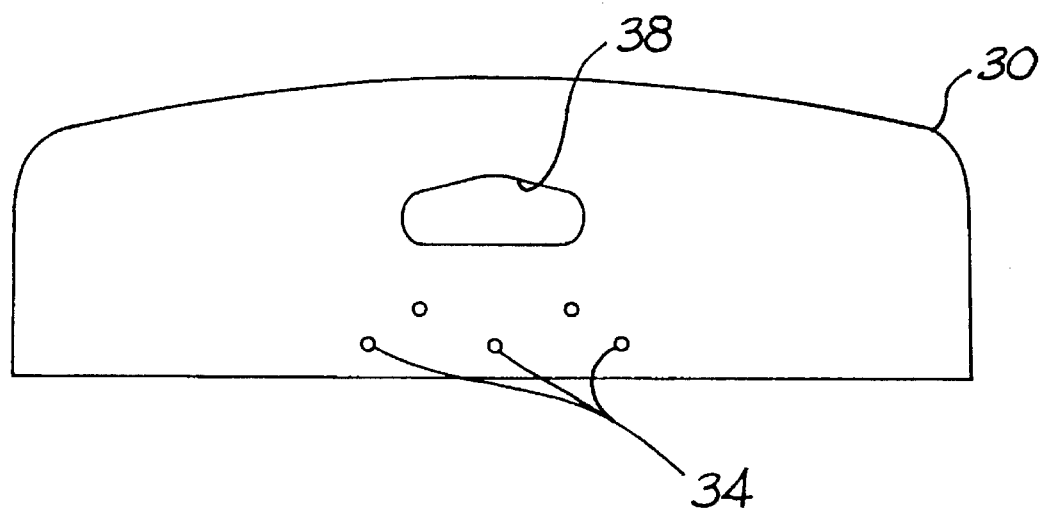
FIG. 4 is a view of the bug shield separated from the tractor.

Referring to the drawing, FIG. 1 illustrates a tractor having a cab 10, and a windshield 12. Hood 14 is located forwardly of the windshield. For illustrative purposes, the vehicle is a FREIGHTLINER conventional tractor and has a hood that swings forwardly when the user grasps a release device, not shown, mounted on the side of the hood. Grille 18 is mounted below the hood and includes an elongated, top metal grille plate 20. Grille plate 20 spans the width of the hood and has its bottom edge forming a channel 22, as best illustrated in FIG. 2. Channel 22 extends the full length of the grille plate.

Metal name plate 24 is smaller than the grille plate. The name plate has five integral rearwardly extending metal studs 26 which are passed through five existing aligned openings such as at 28 in the grille plate. The five studs are arranged in two rows. The two studs in the upper row are 5" apart. The 3 studs in the bottom row are 7½" apart. The two rows are about 1¾" apart. Each stud has a spiral groove, not shown, for engaging a sheet metal nut.

A transparent, acrylic plastic bug shield 30 having a length greater than the length of the grille plate is seated on channel 22, as illustrated in FIGS. 1 and 2. The upper edge of the bug shield extends several inches above the hood. For illustrative purposes, the bug shield is 47" long, 12¾" high and ¼" thick. Bug shield 30 has square lower corners and rounded upper corners. It has five stud-receiving opening means 34 aligned with the five existing openings 28 in the grille plate. The five studs 26 extend through both the grille plate and the bug shield. Sheet metal nuts 36 are mounted on the ends of the 5 studs to firmly connect the bug shield to the grille plate.

The bug shield has a generally centrally located, elongated opening 38, 8" long×2½" high. Opening 38 is sufficiently large to permit the user to insert his hand through the opening to raise or lower the hood. Opening 38 is slightly above the top of the forward end of the hood.

The bug shield may be cut from a sheet of plastic, formed of molded plastic or even of sheet metal.

To install the bug shield, the user removes the existing sheet metal nuts from the name plate studs, then slides the bug shield between grille plate 20 and the forward edge of the hood, seating the bug shield with its lower edge in channel 22. He inserts the studs through the bug shield fastener openings, and then tightly mounts nuts 36 on the ends of the studs. The installation can be made by using the existing structure on the vehicle, thus obviating the necessity for forming new fastener openings.

Having described my invention, I claim:

1. In a vehicle having a hood, a windshield, a grille plate (20) forming the leading surface on the hood, and a name plate (24) mounted on the grille plate;

said grille plate having a plural number of stud-receiving openings, and an integral, pre-existing upwardly facing channel below said stud-receiving openings;

said name plate having a plural number of studs extending through said stud-receiving openings, and fasteners threadable on said studs for normally mounting the name plate on the grille plate:

the improvement comprising a single flat planar plastic sheet having a lower straight edge positionable and loosely seated in said upwardly-facing channel after said name plate has been removed from said grille plate;

said flat plastic sheet having a plural number of stud-receiving holes located above the sheet lower edge, said holes being spaced the same distance apart as the stud-receiving openings in the grille plate;

said holes being sized to receive the studs when the name plate is repositioned on the grille plate, whereby said fasteners can then be threaded onto the studs to clamp said plastic sheet to the grille plate;

said flat plastic sheet having an upper edge located above the hood when said plastic sheet is clamped to the grille plate, whereby said plastic sheet forms a bug shield for the vehicle.

2. The improvement of claim 1, and further comprising a single hand-accommodation opening in said plastic sheet above the stud-receiving holes;

said hand-accommodation being in operative spaced relation above a frontal upper portion of the hood when said plastic sheet is clamped to said grille plate, whereby a person can extend one hand into the hand accommodation opening to raise or lower the hood without removing the plastic sheet.

* * * * *